US012750175B2

(12) United States Patent
He

(10) Patent No.: US 12,750,175 B2
(45) Date of Patent: Sep. 29, 2026

(54) WIRELESS COMMUNICATION METHOD FOR SPEAKER DEVICES AND WIRELESS COMMUNICATION DEVICE THEREOF

(71) Applicant: Jueqing He, Guangzhou (CN)

(72) Inventor: Jueqing He, Guangzhou (CN)

( * ) Notice: Subject to any disclaimer, the term of this patent is extended or adjusted under 35 U.S.C. 154(b) by 230 days.

(21) Appl. No.: 18/892,344

(22) Filed: Sep. 21, 2024

(65) Prior Publication Data

US 2025/0125920 A1 Apr. 17, 2025

(30) Foreign Application Priority Data

Oct. 13, 2023 (CN) ......................... 202311329317.5

(51) Int. Cl.
*H04W 72/54* (2023.01)
*H04L 5/00* (2006.01)
*H04W 72/0453* (2023.01)
*H04W 72/40* (2023.01)

(52) U.S. Cl.
CPC ....... *H04L 5/0046* (2013.01); *H04W 72/0453* (2013.01); *H04W 72/40* (2023.01); *H04W 72/54* (2023.01)

(58) Field of Classification Search
CPC . H04W 72/40; H04W 72/54; H04W 72/0453; H04W 4/80; H04R 3/12; H04R 2420/07; H04L 5/0046; Y02D 30/70
See application file for complete search history.

(56) References Cited

U.S. PATENT DOCUMENTS 11,632,345 B1 * 4/2023 Taylor .................... H04L 51/216
455/412.2
12,437,757 B1 * 10/2025 Eberhardt ........... G10L 15/1815
12,542,132 B1 * 2/2026 Shimoon ............... G10L 15/183
12,573,408 B1 * 3/2026 Ansari ..................... G10L 15/22
12,616,417 B1 * 5/2026 Morris ................. A61B 5/4803
12,664,984 B1 * 6/2026 Wilson .................... G10L 15/22
(Continued)

FOREIGN PATENT DOCUMENTS

CN 114339547 A 4/2022
CN 115499818 A 12/2022

*Primary Examiner* — Syed Ali
(74) *Attorney, Agent, or Firm* — Hemisphere Law, PLLC

(57) ABSTRACT

A wireless communication method for speaker devices, a wireless communication device thereof, and a terminal device relate to a technical field of wireless communication. The wireless communication method includes wirelessly communicating the speaker devices with the control device based on a 5.8 GHz frequency band, obtaining BLUETOOTH signal strengths corresponding to other speaker devices collected by a current speaker device when a radio frequency signal strength of the current speaker device is less than a threshold, communicating the current speaker device with a target speaker device having a maximum BLUETOOTH signal strength, obtaining channel information corresponding to the channels by the control device, selecting target channels respectively for the speaker devices according to channel information, and sending audio data to the speaker devices based on the target channels by the control device. Through the 5.8 GHz frequency band, BLUETOOTH relay, and channel allocation optimization, communication quality is improved.

10 Claims, 3 Drawing Sheets

(56) References Cited

U.S. PATENT DOCUMENTS

| | | | | |
|---|---|---|---|---|
| 2023/0156569 | A1* | 5/2023 | Breaux, III | H04W 12/08<br>381/86 |
| 2023/0180371 | A1* | 6/2023 | Henderson | A61B 5/0008<br>315/363 |
| 2023/0388840 | A1* | 11/2023 | Au | G01S 13/56 |
| 2024/0096316 | A1* | 3/2024 | Henry | G10L 15/08 |
| 2024/0125915 | A1* | 4/2024 | Au | G01S 13/56 |
| 2026/0065898 | A1* | 3/2026 | Marcu | G06N 20/00 |

* cited by examiner

WIRELESS COMMUNICATION METHOD FOR SPEAKER DEVICES AND WIRELESS COMMUNICATION DEVICE THEREOF

CROSS-REFERENCE TO RELATED APPLICATION

This application claims priority to Chinese Patent Application No. 202311329317.5, titled "WIRELESS COMMUNICATION METHOD FOR SPEAKER DEVICES AND WIRELESS COMMUNICATION DEVICE THEREOF" and filed to the China National Intellectual Property Administration on Oct. 13, 2023, the entire contents of which are incorporated herein by reference.

TECHNICAL FIELD

The present disclosure relates to a technical field of wireless communications, and in particular to a wireless communication method for speaker devices and a wireless communication device thereof.

BACKGROUND

Stage sound devices are vital parts of performances and performances. Communicating the stage sound devices via cables is a common solution and is widely used for audio transmission in performances and performance venues. Adopting a wired communication method means that the stage sound devices must be connected via the cables, which limits mobility and layout options of the stage sound devices, especially for scenarios where positions of the stage sound devices need to be frequently adjusted and the stage sound devices need to be rewired. In addition, the wired communication method also limits scalability of the stage sound devices, and additional cable connecting interfaces need to be defined in the stage sound devices to connect more stage sound devices.

In order to solve disadvantages of the stage sound devices that are communicated via the cables, wireless communication technology is adopted to realize communication between wireless stage sound devices. The wireless stage sound devices commonly comprises pairs of transmitters and receivers. Each of the transmitters converts an audio signal into a wireless signal and transmits the wireless signal to a corresponding receiver, while the corresponding receiver decodes the wireless signal into the audio signal. Signals are transmitted between each of the transmitters and the corresponding receiver through wireless communication at a specific frequency.

However, since the wireless stage sound devices are generally far away from each other, if the wireless stage sound devices adopt a conventional wireless communication technology, the signals are transmitted slowly and audio data is easy to lose, which are technical problems that need to be solved urgently.

SUMMARY

In view of defects in the prior art, embodiments of the present disclosure provide a wireless communication method for speaker devices, a wireless communication device thereof, a terminal device, and a computer-readable storage medium to solve technical problems that since wireless stage sound devices adopting a conventional wireless communication technology are generally far away from each other, signals are transmitted slowly and audio data is easy to lose.

In a first aspect, the present disclosure provides the wireless communication method for speaker devices. The wireless communication method comprises steps:

- wirelessly communicating the speaker devices with the control device based on a 5.8 GHz frequency band;
- obtaining, by the control device, sub-bands in the 5.8 GHz frequency band, and configuring the sub-bands as channels;
- sending, by the control device, explore data to the speaker devices by predetermined channels, and obtaining radio frequency signal strengths respectively corresponding to the speaker devices according to the explore data;
- sending, by the control device, BLUETOOTH instructions to the speaker devices, and obtaining BLUETOOTH signal strengths corresponding to other speaker devices collected by each of the speaker devices, where the BLUETOOTH instructions are respectively configured to control the speaker devices to respectively turn on BLUETOOTH signals;
- obtaining BLUETOOTH signal strengths corresponding to the other speaker devices collected by a current speaker device when a radio frequency signal strength of the current speaker device is less than a threshold, communicating the current speaker device with a target speaker device having a maximum BLUETOOTH signal strength, and forwarding audio data to the current speaker device by the target speaker device;
- obtaining, by the control device, channel information corresponding to the channels, and selecting target channels respectively for the speaker devices according to the channel information; and sending, by the control device, the audio data to the speaker devices based on the target channels.

Furthermore, the step of wirelessly communicating the speaker devices with the control device based on the 5.8 GHz frequency band comprises steps:

- broadcasting, by the control device, an explore frame based on the 5.8 GHz frequency band, and turning on a wireless network;
- receiving, by the speaker devices, the explore frame, and extracting a target field in the explore frame by each of the speaker devices;
- performing, by each of the speaker devices, an exclusive OR (XOR) operation on the target field and a pre-stored field thereof to obtain a calculation result, and sending the calculation result and a local message authentication code (MAC) address of each of the speaker devices to the control device;
- performing, by the control device, a correctness check on each calculation result;
- when one calculation result is verified to be passed, sending a response frame to the local MAC address of a corresponding speaker device corresponding to the one calculation result, where the response frame comprises a service set identifier and a password; and
- communicating with the wireless network by the corresponding speaker device according to the service set identifier and the password.

Furthermore, the step of obtaining, by the control device, the channel information corresponding to the channels, and selecting the target channels respectively for the speaker devices according to the channel information comprises:

obtaining radio frequency signal strengths, signal-to-noise ratios, bit error rates, delays, capacities, and power consumption of the channels;

calculating first channel qualities respectively corresponding to the channels according to the radio frequency signal strengths, the signal-to-noise ratios, the bit error rates, the delays, the capacities, and the power consumption of the channels;

calculating second channel qualities respectively corresponding to the channels according to the radio frequency signal strengths, the signal-to-noise ratios, the bit error rates, the delays, the capacities, and the power consumption of the channels; and selecting a first target channel for the target speaker device according to the first channel qualities, and selecting a second target channel for non-target speaker devices according to the second channel qualities.

Furthermore, the step of calculating the first channel qualities respectively corresponding to the channels according to the radio frequency signal strengths, the signal-to-noise ratios, the bit error rates, the delays, the capacities, and the power consumption of the channels comprises:

substituting a radio frequency signal strength, a signal-to-noise ratio, bit error rates, delays, a capacity, and power consumption of each of the channel into a formula (1) to obtain each of the first channel qualities;

$$Q_1 = \sum_{i=1}^{n}\left[\frac{S * \log(SNR + I)}{\log(BER_I + I)} + + \prod_{j=1}^{m}\left(\frac{T_j + j}{C}\right) + \sqrt{p}\right]. \tag{1}$$

$Q_1$ represents each of the first channel qualities, SNR represents the signal-to-noise ratio of each of the channels, $BER_i$ represents an $i^{th}$ bit error rate of each of the channels, C represents the capacity of each of the channels, $T_j$ represents a $j^{th}$ delay of each of the channels, m represents a quantity of delays of each of the channels, S represents the radio frequency signal strength of each of the channels, n represents a quantity of the bit error rates of each of the channels, and P represents the power consumption of each of the channels.

Furthermore, the step of calculating the second channel qualities respectively corresponding to the channels according to the radio frequency signal strengths, the signal-to-noise ratios, the bit error rates, the delays, the capacities, and the power consumption of the channels comprises:

substituting a radio frequency signal strength, a signal-to-noise ratio, bit error rates, delays, a capacity, and power consumption of each of the channel into a formula (2) to obtain each of the second channel qualities;

$$Q_2 = \frac{S}{SNR} * \left(1 - \sum_{i=1}^{n} BER_i\right) * \left(1 - \sum_{j=1}^{m} T_j\right) * C * e^{-p}. \tag{2}$$

$Q_2$ represents each of the second channel qualities, SNR represents the signal-to-noise ratio of each of the channels, $BER_i$ represents an $i^{th}$ bit error rate of each of the channels, C represents the capacity of each of the channels, $T_j$ represents a $j^{th}$ delay of each of the channels, m represents a quantity of delays of each of the channels, S represents the radio frequency signal strength of each of the channels, n represents a quantity of the bit error rates of each of the channels, and P represents the power consumption of each of the channels.

Furthermore, the step of obtaining the BLUETOOTH signal strengths corresponding to the other speaker devices collected by the current speaker device when the radio frequency signal strength of the current speaker device is less than the threshold, communicating the current speaker device with the target speaker device having the maximum BLUETOOTH signal strength, and forwarding the audio data to the current speaker device by the target speaker device comprises steps:

obtaining the BLUETOOTH signal strengths corresponding to the other speaker devices collected by the current speaker device when the radio frequency signal strength of the current speaker device is less than the threshold;

determining the target speaker device having the maximum BLUETOOTH signal strength by the current speaker device, and sending device information of the target speaker device to the control device by the current speaker device;

obtaining, by the control device, a current radio frequency signal strength corresponding to the device information; and communicating the current speaker device with the target speaker device having the maximum BLUETOOTH signal strength by the control device when the current radio frequency signal strength is not less than the predetermined strength.

Furthermore, the step of selecting the first target channel for the target speaker device according to the first channel qualities, and selecting the second target channel respectively for the non-target speaker devices according to the second channel qualities comprises:

sorting the channels according to the first channel qualities, and taking a first sorted channel as the first target channel of the target speaker device; and sorting remaining channels according to the second channel qualities, and taking a first sorted remaining channel as the second target channel of the non-target speaker devices, where the remaining channels refer to channels other than the first target channel.

In a second aspect, the present disclosure provide the wireless communication device for the speaker devices. The wireless communication device comprises a communication unit, an acquisition unit, an explore unit, a detection unit, a Judgment unit, a selection unit, and a sending unit.

The communication unit is configured to wirelessly communicate the speaker devices to the control device based on a 5.8 GHz frequency band. The acquisition unit is configured to enable the control device to obtain sub-bands in the 5.8 GHz frequency band. The sub-bands are served as channels. The explore unit is configured to enable the control device to send explore data to the speaker devices through predetermined channels. The explore unit is configured to obtain radio frequency signal strengths respectively corresponding to the speaker devices according to the explore data.

The detection unit is configured to enable the control device to send BLUETOOTH instructions to the speaker devices, and the detection unit is configured to obtain BLUETOOTH signal strengths corresponding to other speaker devices collected by each of the speaker devices. The BLUETOOTH instructions are respectively configured to control the speaker devices to respectively turn on BLUETOOTH signals.

The judgement unit is configured to obtain BLUETOOTH signal strengths corresponding to the other speaker devices collected by a current speaker device when a radio frequency signal strength of the current speaker device is less than a threshold. The judgement unit is further configured to communicate the current speaker device to a target speaker device having a maximum BLUETOOTH signal strength. The target speaker device is configured to forward audio data to the current speaker device.

The selection unit is configured to enable the control device to obtain channel information corresponding to the channels, and the selection unit is configured to select target channels respectively for the speaker devices according to the channel information. The sending unit is configured to enable the control device to send the audio data to the speaker devices based on the target channels.

In a third aspect, the present disclosure provides the terminal device. The terminal device comprises a memory, a processor, and a computer program.

The computer program is stored in the memory and is executable on the processor. When the processor executes the computer program, the steps of the wireless communication method mentioned above is executed.

In a fourth aspect, the present disclosure provides the computer-readable storage medium. The computer-readable storage medium comprises a computer program stored therein. The computer program is executed by a processor to execute the steps of the wireless communication method mentioned above.

Compared with the prior art, in the present disclosure, the speaker devices are wirelessly communicated with the control device based on the 5.8 GHz frequency band. The control device obtains the sub-bands in the 5.8 GHz frequency band, and the sub-bands are served as the channels. The control device sends the explore data to the speaker devices through the predetermined channels. The radio frequency signal strengths respectively corresponding to the speaker devices are obtained according to the explore data. The control device sends the BLUETOOTH instructions to the speaker devices, and obtains the BLUETOOTH signal strengths corresponding to the other speaker devices collected by each of the speaker devices. The BLUETOOTH instructions are respectively configured to control the speaker devices to respectively turn on the BLUETOOTH signals.

The BLUETOOTH signal strengths corresponding to the other speaker devices collected by the current speaker device are obtained when the radio frequency signal strength of the current speaker device is less than the threshold, and the current speaker device is communicated with the target speaker device having the maximum BLUETOOTH signal strength. The target speaker device is configured to forward audio data to the current speaker device. The control device obtains channel information corresponding to the channels, and selects target channels respectively for the speaker devices according to the channel information. The sending unit is configured to enable the control device to send the audio data to the speaker devices based on the target channels.

In the present disclosure, since the 5.8 GHz frequency band has a higher bandwidth compared to a low frequency band (such as a 2.4 GHz frequency band), the 5.8 GHz frequency band is enabled to support a greater capacity of data transmission, so the 5.8 GHz frequency band is capable of being applied to high-speed data transmission and streaming media applications, which solves a problem of slow signal transmission. In addition, in order to solve a problem of easy loss of the audio data due to long-distance transmission (some stage sound devices are far away from the control device), in the present disclosure, the current speaker device far away from the control device is first selected based on the radio frequency signal strengths, and the BLUETOOTH signal strengths of the speaker devices located around the current speaker device are obtained, then the current speaker device is communicated with the target speaker device having the maximum BLUETOOTH signal strength, so the target speaker device is configured as a relay device of the current speaker device, and the target speaker device forwards the audio data to the current speaker device, which form a cascade relationship of 5.8 GHz+BLUETOOTH connection and solves the problem of easy loss of the audio data due to weak signal strength. In order to further improves communication quality, the present disclosure matches different channels for different speaker devices based on the channel information, thereby improving the communication quality.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

DETAILED DESCRIPTION

The following descriptions are provided for purposes of explanation and cannot be regarded as limitations. Specific details such as specific system structures and technologies are proposed to provide a thorough understanding of the embodiments of the present disclosure. However, it is apparent to those skilled in the art that the present disclosure may be practiced in other embodiments without these specific details. In other instances, detailed descriptions of well-known systems, devices, circuits, and methods are omitted so as not to obscure the description of the present disclosure with unnecessary detail.

Embodiments of the present disclosure provide a wireless communication method for speaker devices, a wireless communication device thereof, a terminal device, and a computer-readable storage medium to solve technical problems that since wireless stage sound devices adopting a conventional wireless communication technology are generally far away from each other, signals are transmitted slowly and audio data is easy to lose.

Figure 1:
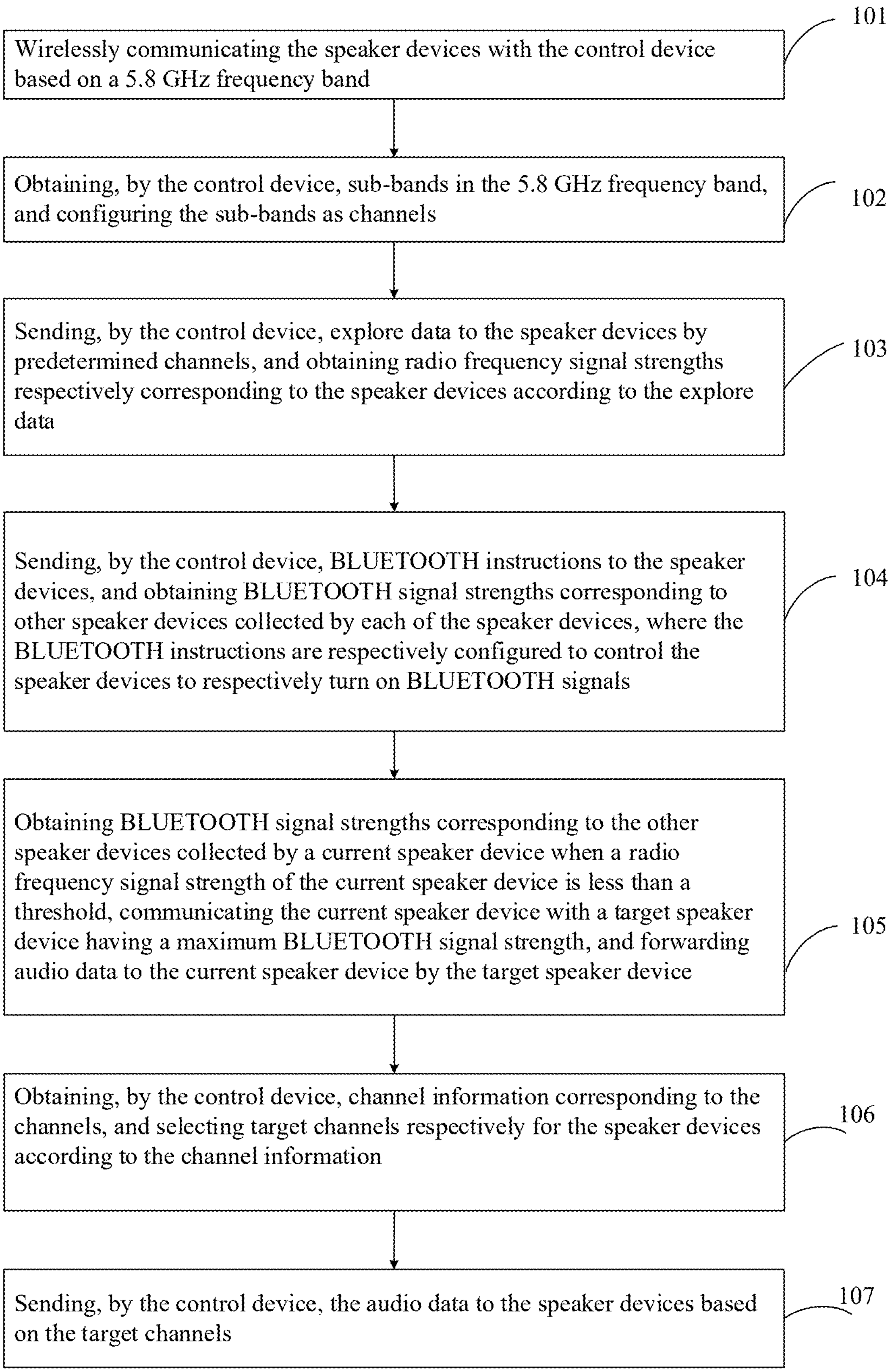
FIG. 1 is a flow chart of a wireless communication method for speaker devices according to one embodiment of the present disclosure.

In a first aspect, the present disclosure provides the wireless communication method for speaker devices. The wireless communication method is applied to a sound system. The sound system comprises a control device and speaker devices. FIG. 1 is a flow chart of the wireless communication method for the speaker devices of the present disclosure. As shown in FIG. 1, the wireless communication method for the speaker devices comprises steps 101-107.

The step 101 comprises wirelessly communicating the speaker devices with the control device based on a 5.8 GHz frequency band.

The 5.8 GHz frequency band has a greater bandwidth than a low-frequency band (such as a 2.4 GHz frequency band), which means that the 5.8 GHz frequency band is able to support a larger capacity of data transmission, so the 5.8 GHz frequency band is suitable for high-speed data transmission and streaming applications. Compared with the 2.4 GHz frequency band that is commonly used, the 5.8 GHz frequency band is more stable in use. In addition, due to a relatively high frequency band is used, there are relatively fewer interference sources. In a high-density wireless environment, the 5.8 GHz frequency band provides more reliable transmission performance. The 5.8 GHz frequency band has a faster signal transmission speed, resulting in lower latency, making the 5.8 GHz frequency band being very suitable for applications with high real-time requirements. Compared with low-frequency bands, the 5.8 GHz frequency band has stronger signal penetration. When encountering obstacles (such as walls, furniture, etc.), signal quality of the 5.8 GHz frequency band is more stable and provides better coverage. The 5.8 GHz frequency band provides more channel options, which means that in the high-density wireless network environment, channels that do not interfere with each other are selected to reduce interference and signal conflicts, which provide better performance and stability. Based on characteristics of the 5.8 GHz frequency band, the present disclosure adopts the 5.8 GHz frequency band to wirelessly connect the control device and the speaker devices.

Since there may be a variety of devices in an actual environment, in order to prevent the devices from being connected by mistake, the embodiment provides a connection logic between the control device and the speaker devices, which is set forth as follows.

Specifically, the step 101 comprises steps 1011-1016.

The step 1011 comprise broadcasting, by the control device, an explore frame based on the 5.8 GHz frequency band, and turning on a wireless network.

The explore frame is configured to detect the speaker devices provided in a current environment.

The step 1012 comprises receiving, by the speaker devices, the explore frame, and extracting a target field in the explore frame by each of the speaker devices.

A specific code is stored in the target field of the explore frame, so that the speaker devices verify their identities based on the target field (i.e., non-speaker devices are distinguished).

The step 1013 comprises performing, by each of the speaker devices, an exclusive OR (XOR) operation on the target field and a pre-stored field thereof to obtain a calculation result, and sending the calculation result and a local message authentication code (MAC) address of each of the speaker devices to the control device.

The control device pre-stores calculation results corresponding to the speaker devices, and it is determined whether devices are the speaker devices based on the calculation results. There is no pre-stored field stored in the non-speaker devices, so a correct calculation result is unable to be calculated.

The step 1014 comprises performing, by the control device, a correctness check on each calculation result.

The step 1015 comprises when one calculation result is verified to be passed, sending a response frame to the local MAC address of a corresponding speaker device corresponding to the one calculation result, where the response frame comprises a service set identifier and a password.

The step 1016 comprises communicating with the wireless network by the corresponding speaker device according to the service set identifier and the password.

In the embodiment, wireless connection between the control device and the speaker devices is realized, and the non-speaker devices are effectively prevented from being connected by mistake. By using the explore frame, the calculation results and verification of each response frame, it is ensured that only the speaker devices having the calculation results that are correct are allowed to be connected to the wireless network. By using the XOR operation and by verifying the calculation results, authentication measures for connection requests of the speaker devices are further enhanced, which effectively reduces a risk of connections of unauthorized devices. In summary, the embodiment realizes the connections between the control device and the speaker devices through a series of processes, and effectively prevents the non-speaker devices from being connected by mistake during a connection process, thereby improving security and connection accuracy.

The step 102 comprises obtaining, by the control device, sub-bands in the 5.8 GHz frequency band, and configuring the sub-bands as channels.

The step 103 comprises sending, by the control device, explore data to the speaker devices by predetermined channels, and obtaining radio frequency signal strengths respectively corresponding to the speaker devices according to the explore data.

In order to select any long-distance speaker device, the present disclosure determines a distance between each of the speaker devices and the control device by the radio frequency signal strengths.

The step 104 comprises sending, by the control device, BLUETOOTH instructions to the speaker devices, and obtaining BLUETOOTH signal strengths corresponding to other speaker devices collected by each of the speaker devices, where the BLUETOOTH instructions are respectively configured to control the speaker devices to respectively turn on BLUETOOTH signals.

In order to improve communication quality of the long-distance speaker device, each of the speaker devices is equipped with a BLUETOOTH module. Therefore, the long-distance speaker device is allowed to be connected to other speaker devices via BLUETOOTH. That is, the other speaker devices are served as relay devices to forward audio information to the long-distance speaker device via BLUETOOTH signals, realizing a 5.8 GHz+BLUETOOTH connection method, and improving communication quality.

The step 105 comprises obtaining BLUETOOTH signal strengths corresponding to the other speaker devices collected by a current speaker device when a radio frequency signal strength of the current speaker device is less than a threshold, communicating the current speaker device with a target speaker device having a maximum BLUETOOTH signal strength, and forwarding audio data to the current speaker device by the target speaker device.

If the radio frequency signal strength of the current speaker device is less than the threshold, it means that communication quality of the current speaker device is poor, so the current speaker device is connected with a nearby speaker device (i.e., the target speaker device) through the BLUETOOTH.

It should be noted that if the target speaker device is only selected by the BLUETOOTH signal strengths, the communication quality of the current speaker device is unable to be improved if the target speaker device is also far away from the control device. Therefore, it is necessary to select the target speaker device with high radio frequency signal strength. A specific selection logic thereof is as follows.

Specifically, the step 105 comprises steps 1051-1054.

The step 1051 comprises obtaining the BLUETOOTH signal strengths corresponding to the other speaker devices collected by the current speaker device when the radio frequency signal strength of the current speaker device is less than the threshold.

The step 1052 comprises determining the target speaker device having the maximum BLUETOOTH signal strength by the current speaker device, and sending device information of the target speaker device to the control device by the current speaker device.

Since the current speaker device is unable to determine the radio frequency signal strength of the target speaker device, the current speaker device sends the device information the target speaker device to the control device so that the radio frequency signal strength radio of the target speaker device is determined by the control device.

The step 1053 comprises obtaining, by the control device, a current radio frequency signal strength corresponding to the device information.

The step 1054 comprises communicating the current speaker device with the target speaker device having the maximum BLUETOOTH signal strength by the control device when the current radio frequency signal strength is not less than the predetermined strength.

In the embodiment, the target speaker device is selected according to the radio frequency signal strengths and the BLUETOOTH signal strengths to complete automatic connection function. The current speaker device obtains the BLUETOOTH signal strengths of other speaker devices. After the BLUETOOTH signal strengths of the other speaker devices is collected, the current speaker device selects the target speaker device with the maximum BLUETOOTH signal strength as a connection target according to the BLUETOOTH signal strengths. The current speaker device sends the device information of the target speaker device to the control device. After receiving the device information of the target speaker device, the control device obtains the current radio frequency signal strength of the target speaker device. If the radio frequency signal strength of the target speaker device is not lower than the predetermined strength, the target speaker device meets the requirement, and the current speaker device is then connected with the target speaker device having the maximum BLUETOOTH signal strength. By using the technical solution, a more stable and reliable connection of the speaker devices is achieved.

The step 106 comprises obtaining, by the control device, channel information corresponding to the channels, and selecting target channels respectively for the speaker devices according to the channel information.

The channel information comprises, but is not limited to, information such as radio frequency signal strengths, signal-to-noise ratios, bit error rates, delays, capacities, power consumption, and a combination thereof.

The step 106 specifically comprises steps 1061-1064.

The step 1061 comprises obtaining radio frequency signal strengths, signal-to-noise ratios, bit error rates, delays, capacities, and power consumption of the channels.

Each radio frequency signal strength represent a reception strength of the wireless signal. Greater signal strength generally represents better channel quality. Each signal-to-noise ratio represents a proportional relationship between a corresponding valid signal and a corresponding background noise. A higher signal-to-noise ratio generally means better channel quality. Each bit error rate represents a proportion of errors in a corresponding transmission process, and is usually measured by the number of errors per bit or the number of errors per frame. A lower bit error rate generally indicates better channel quality. Each capacity refers to a maximum data rate for transmitted by a corresponding channel. A higher capacity indicates that the corresponding channel is able to support a higher data transmission rate. Each delay represents a transmission time of a signal transmitted from a transmit end thereof to a receive end thereof. A smaller delay is generally of great significance to applications such as real-time audio transmission. Each power consumption represents energy consumption required for the corresponding channel. Lower power consumption may be more beneficial to power saving and extend battery life of each of the speaker devices.

The control device sends test signals on each of the channels to obtain a radio frequency signal strength, a signal-to-noise ratio, a bit error rate, a delay, a capacity, and power consumption corresponding to each of the channels.

The step 1062 comprises calculating first channel qualities respectively corresponding to the channels according to the radio frequency signal strengths, the signal-to-noise ratios, the bit error rates, the delays, the capacities, and the power consumption of the channels.

Specifically, the step 1062 is realized by substituting a radio frequency signal strength, a signal-to-noise ratio, bit error rates, delays, a capacity, and power consumption of each of the channel into a formula (1) to obtain each of the first channel qualities:

$$Q_1 = \sum_{i=1}^{n}\left[\frac{S * \log(SNR + I)}{\log(BER_I + I)} + + \prod_{j=1}^{m}\left(\frac{T_j + j}{C}\right) + \sqrt{p}\right]. \tag{1}$$

$Q_1$ represents each of the first channel qualities, SNR represents the signal-to-noise ratio of each of the channels, $BER_i$ represents an $i^{th}$ bit error rate of each of the channels, C represents the capacity of each of the channels, $T_j$ represents a $j^{th}$ delay of each of the channels, m represents a quantity of the delays of each of the channels, S represents the radio frequency signal strength of each of the channels, n represents a quantity of the bit error rates of each of the channels, and P represents the power consumption of each of the channels.

In the present disclosure, multiple factors are comprehensively considered, and due to the fact that the radio frequency signal strengths, the signal-to-noise ratios, the bit error rates, the delays, the capacities and the power consumption have a certain influence on the first channel qualities. Each of the first channel qualities is calculated based on the radio frequency signal strength of each of the channels, the signal-to-noise ratio of each of the channels, the bit error rate of each of the channels, the delays of each of the channels, the capacity of each of the channels, and the power consumption of each of the channels, so as to realize high-precision clustering. The formula (1) is obtained based on a large amount of experimental data and verification, but is not limited to the foregoing mathematical expression.

The step 1063 comprises calculating second channel qualities respectively corresponding to the channels according to the radio frequency signal strengths, the signal-to-noise ratios, the bit error rates, the delays, the capacities, and the power consumption of the channels.

Specifically, the step 1063 is realized by substituting a radio frequency signal strength, a signal-to-noise ratio, bit error rates, delays, a capacity, and power consumption of each of the channel into a formula (2) to obtain each of the second channel qualities:

$$Q_2 = \frac{S}{SNR} * \left(1 - \sum_{i=1}^{n} BER_i\right) * \left(1 - \sum_{j=1}^{m} T_j\right) * C * e^{-P}. \quad (2)$$

$Q_2$ represents each of the second channel qualities, SNR represents the signal-to-noise ratio of each of the channels, $BER_i$ represents an ith bit error rate of each of the channels, C represents the capacity of each of the channels, $T_j$ represents a jth delay of each of the channels, m represents a quantity of delays of each of the channels, S represents the radio frequency signal strength of each of the channels, n represents a quantity of the bit error rates of each of the channels, and P represents the power consumption of each of the channels.

In the present disclosure, multiple factors are comprehensively considered, and due to the fact that the radio frequency signal strengths, the signal-to-noise ratios, the bit error rates, the delays, the capacities and the power consumption have a certain influence on the second channel qualities. Each of the second channel qualities is calculated based on the radio frequency signal strength of each of the channels, the signal-to-noise ratio of each of the channels, the bit error rate of each of the channels, the delays of each of the channels, the capacity of each of the channels, and the power consumption of each of the channels, so as to realize high-precision clustering. The formula (2) is obtained based on a large amount of experimental data and verification, but is not limited to the foregoing mathematical expression.

It should be noted that due to a difference between selections of the channels by the target speaker device and the non-target speaker devices, emphases for the radio frequency signal strengths, the signal-to-noise ratios, the bit error rates, the delays, the capacities, and the power consumption are different. Therefore, channel qualities (i.e., the first channel qualities and the second channel qualities) respectively corresponding to the target speaker device and the non-target speaker devices need to be calculated respectively to match appropriate channels.

The step 1064 comprises selecting a first target channel for the target speaker device according to the first channel qualities, and selecting a second target channel for non-target speaker devices according to the second channel qualities.

Specifically, the step 1064 comprises steps A1-A2.

The step A1 comprises sorting the channels according to the first channel qualities, and taking a first sorted channel as the first target channel of the target speaker device.

Because the target speaker device is responsible for data forwarding of the current speaker device, the target speaker device needs to match an appropriate channel preferentially.

The step A2 comprises sorting remaining channels according to the second channel qualities, and taking a first sorted remaining channel as the second target channel of the non-target speaker devices, where the remaining channels refer to channels other than the first target channel.

In order to ensure communication quality, different speaker devices need to perform data communication in different channels, so that the non-target speaker devices needs to select other channels in the remaining channels for wireless communication.

It should be noted that, because the target speaker device is responsible for a data forwarding function, requirements for a corresponding radio frequency signal strength, corresponding delays, and a corresponding capacity are relatively high. The non-target speaker devices only needs to consider the communication quality between the non-target speaker devices and the control device, so that the requirements on corresponding signal-to-noise ratios and corresponding bit error rates are relatively high. Therefore, in the present disclosure, the emphases on the radio frequency signal strengths, the signal-to-noise ratios, the bit error rates, the delays, the capacities, and the power consumption of the target speaker device and the non-target speaker devices are different. Therefore, two types of channel quality calculation logic are respectively provided, so that reasonable communication channels are respectively allocated to the target speaker device and the non-target speaker devices, and the overall communication quality of the sound system is improved.

The step 107 comprises sending, by the control device, the audio data to the speaker devices based on the target channels.

In the present disclosure, the speaker devices are wirelessly communicated with the control device based on the 5.8 GHz frequency band. The control device obtains the sub-bands in the 5.8 GHz frequency band, and the sub-bands are served as the channels. The control device sends the explore data to the speaker devices through the predetermined channels. The radio frequency signal strengths respectively corresponding to the speaker devices are obtained according to the explore data. The control device sends the BLUETOOTH instructions to the speaker devices, and obtains the BLUETOOTH signal strengths corresponding to the other speaker devices collected by each of the speaker devices. The BLUETOOTH instructions are respectively configured to control the speaker devices to respectively turn on the BLUETOOTH signals.

The BLUETOOTH signal strengths corresponding to the other speaker devices collected by the current speaker device are obtained when the radio frequency signal strength of the current speaker device is less than the threshold, and the current speaker device is communicated with the target speaker device having the maximum BLUETOOTH signal strength. The target speaker device is configured to forward audio data to the current speaker device. The control device obtains channel information corresponding to the channels, and selects target channels respectively for the speaker devices according to the channel information. The sending unit is configured to enable the control device to send the audio data to the speaker devices based on the target channels.

In the present disclosure, since the 5.8 GHz frequency band has a higher bandwidth compared to a low frequency band (such as the 2.4 GHz frequency band), the 5.8 GHz frequency band is enabled to support a greater capacity of data transmission, so the 5.8 GHz frequency band is capable of being applied to high-speed data transmission and streaming media applications, which solves a problem of slow signal transmission. In addition, in order to solve a problem of easy loss of the audio data due to long-distance transmission (some stage sound devices are far away from the control device), in the present disclosure, the current speaker device far away from the control device is first selected based on the radial frequency signal strengths, and the BLUETOOTH signal strengths of the speaker devices located around the current speaker device are obtained, then the current speaker device is communicated with the target speaker device having the maximum BLUETOOTH signal strength, so the target speaker device is configured as a relay device of the current speaker device, and the target speaker device forwards the audio data to the current speaker device, which form a cascade relationship of 5.8 GHz+BLUETOOTH connection and solves the problem of easy loss of the audio data due to weak signal strength. In order to further improves communication quality, the present disclosure matches different channels for different speaker devices based on the channel information, thereby improving the communication quality.

Figure 2:
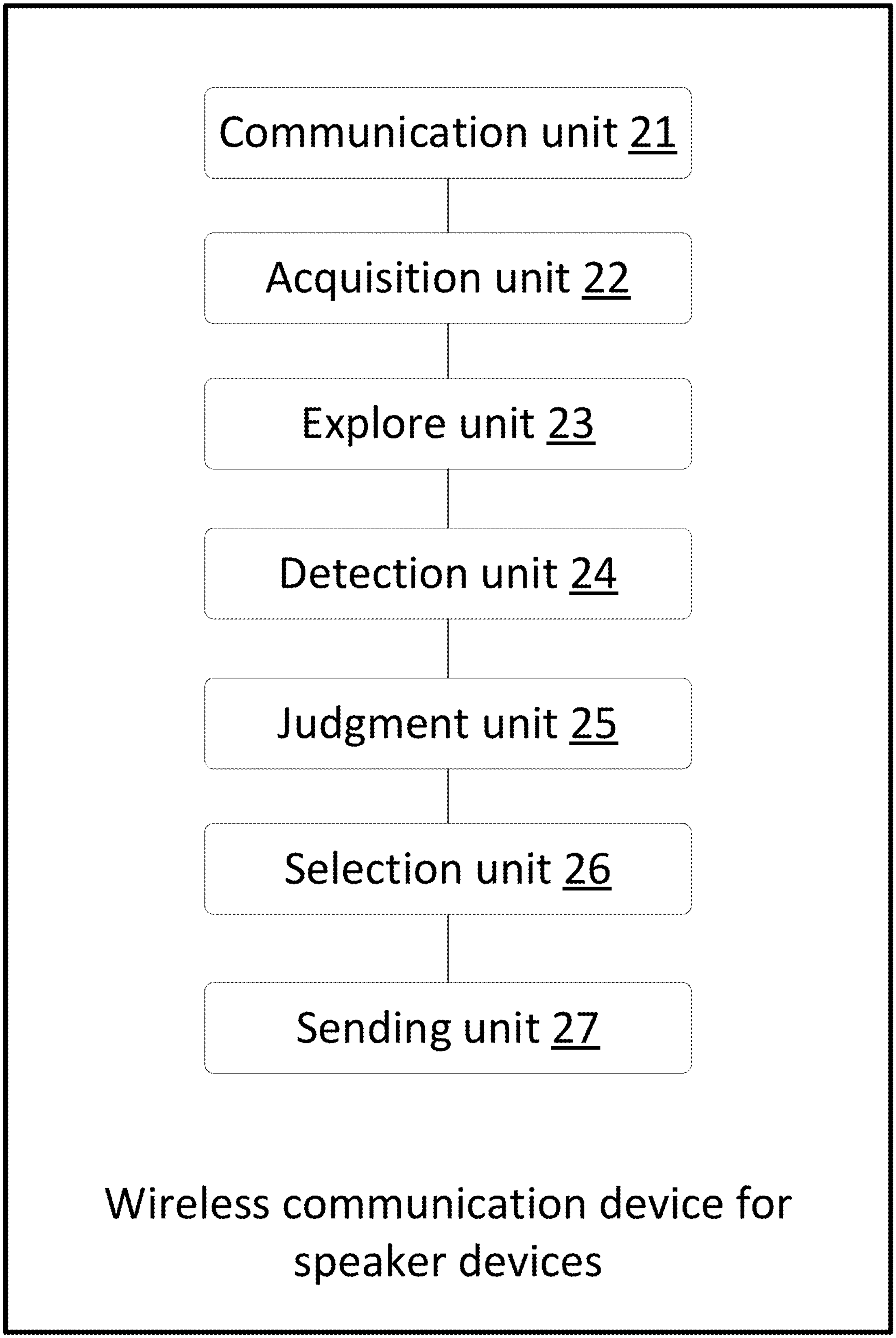
FIG. 2 is a schematic diagram of a wireless communication device for the speaker devices according to one embodiment of the present disclosure.

As shown in FIG. 2, the present disclosure provides the wireless communication device 2 for the speaker devices. FIG. 2 is a schematic diagram of the wireless communication device for the speaker devices of the present disclosure. The wireless communication device for the speaker devices comprises a communication unit 21, an acquisition unit 22, an explore unit 23, a detection unit 24, a Judgment unit 25, a selection unit 26, and a sending unit 27.

The communication unit 21 is configured to wirelessly communicate the speaker devices to the control device based on a 5.8 GHz frequency band. The acquisition unit 22 is configured to enable the control device to obtain sub-bands in the 5.8 GHz frequency band. The sub-bands are served as channels. The explore unit 23 is configured to enable the control device to send explore data to the speaker devices through predetermined channels. The explore unit 23 is configured to obtain radio frequency signal strengths respectively corresponding to the speaker devices according to the explore data.

The detection unit 24 is configured to enable the control device to send BLUETOOTH instructions to the speaker devices, and the detection unit is configured to obtain BLUETOOTH signal strengths corresponding to other speaker devices collected by each of the speaker devices. The BLUETOOTH instructions are respectively configured to control the speaker devices to respectively turn on BLUETOOTH signals.

The judgement unit 25 is configured to obtain BLUETOOTH signal strengths corresponding to the other speaker devices collected by a current speaker device when a radio frequency signal strength of the current speaker device is less than a threshold. The judgement unit is further configured to communicate the current speaker device to a target speaker device having a maximum BLUETOOTH signal strength. The target speaker device is configured to forward audio data to the current speaker device.

The selection unit 26 is configured to enable the control device to obtain channel information corresponding to the channels, and the selection unit is configured to select target channels respectively for the speaker devices according to the channel information. The sending unit 27 is configured to enable the control device to send the audio data to the speaker devices based on the target channels.

In the present disclosure, the speaker devices are wirelessly communicated with the control device based on the 5.8 GHz frequency band. The control device obtains the sub-bands in the 5.8 GHz frequency band, and the sub-bands are served as the channels. The control device sends the explore data to the speaker devices through the predetermined channels. The radio frequency signal strengths respectively corresponding to the speaker devices are obtained according to the explore data. The control device sends the BLUETOOTH instructions to the speaker devices, and obtains the BLUETOOTH signal strengths corresponding to the other speaker devices collected by each of the speaker devices. The BLUETOOTH instructions are respectively configured to control the speaker devices to respectively turn on the BLUETOOTH signals.

The BLUETOOTH signal strengths corresponding to the other speaker devices collected by the current speaker device are obtained when the radio frequency signal strength of the current speaker device is less than the threshold, and the current speaker device is communicated with the target speaker device having the maximum BLUETOOTH signal strength. The target speaker device is configured to forward audio data to the current speaker device. The control device obtains channel information corresponding to the channels, and selects target channels respectively for the speaker devices according to the channel information. The sending unit is configured to enable the control device to send the audio data to the speaker devices based on the target channels.

In the present disclosure, since the 5.8 GHz frequency band has a higher bandwidth compared to a low frequency band (such as the 2.4 GHz frequency band), the 5.8 GHz frequency band is enabled to support the greater capacity of data transmission, so the 5.8 GHz frequency band is capable of being applied to high-speed data transmission and streaming media applications, which solves the problem of slow signal transmission. In addition, in order to solve the problem of the easy loss of the audio data due to long-distance transmission (some stage sound devices are far away from the control device), in the present disclosure, the current speaker device far away from the control device is first selected based on the radial frequency signal strengths, and the BLUETOOTH signal strengths of the speaker devices located around the current speaker device are obtained, then the current speaker device is communicated with the target speaker device having the maximum BLUETOOTH signal strength, so the target speaker device is configured as the relay device of the current speaker device, and the target speaker device forwards the audio data to the current speaker device, which form the cascade relationship of 5.8 GHz+BLUETOOTH connection and solves the problem of the easy loss of the audio data due to weak signal strength. In order to further improves communication quality, the present disclosure matches different channels for different speaker devices based on the channel information, thereby improving the communication quality.

Figure 3:
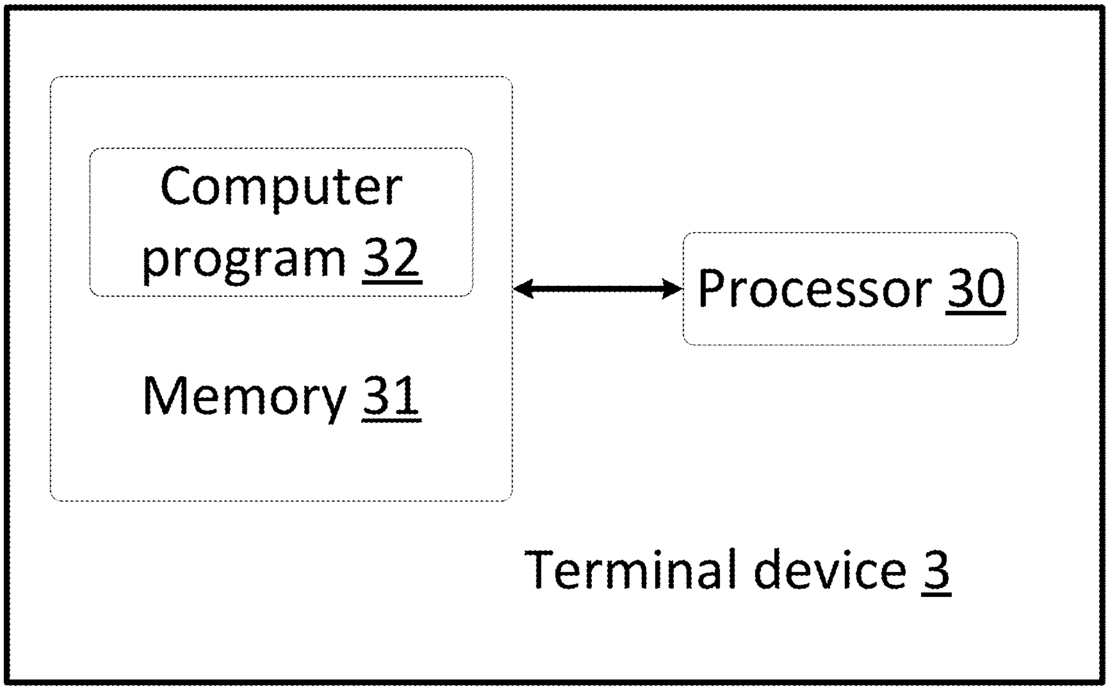
FIG. 3 is a schematic diagram of a terminal device according to one embodiment of the present disclosure.

FIG. 3 is a schematic diagram of the terminal device of the present disclosure. As shown in FIG. 3, the terminal device comprises a memory 31, a processor 30, and a computer program 32.

The computer program 32 is stored in the memory 31 and is executable on the processor 20. The computer program 32 may be a wireless communication program for the speaker devices. When the processor 30 executes the computer program 32 executes the steps (such as the steps 101-107) of the wireless communication method mentioned above. Alternatively, when the processor 30 executes the computer program 32, functions of units (such as the functions of the units 21 to 27 shown in FIG. 2) in the wireless communication device of the above-mentioned embodiments are implemented.

Specifically, the computer program 32 may be divided into one or more units, which are stored in the memory 31 and executed by the processor 30 to complete the present disclosure. The one or more units may be a series of computer program instruction segments capable of completing specific functions, which are configured to describe an execution process of the computer program 32 in the terminal device 3. For example, the computer program 32 may be divided into a communication unit, an acquisition unit, an explore unit, a detection unit, a Judgment unit, a selection unit, and a sending unit.

The communication unit is configured to wirelessly communicate the speaker devices to the control device based on a 5.8 GHz frequency band. The acquisition unit is configured to enable the control device to obtain sub-bands in the 5.8 GHz frequency band. The sub-bands are served as channels. The explore unit is configured to enable the control device to send explore data to the speaker devices through predetermined channels. The explore unit is configured to obtain radio frequency signal strengths respectively corresponding to the speaker devices according to the explore data.

The detection unit is configured to enable the control device to send BLUETOOTH instructions to the speaker devices, and the detection unit is configured to obtain BLUETOOTH signal strengths corresponding to other speaker devices collected by each of the speaker devices. The BLUETOOTH instructions are respectively configured to control the speaker devices to respectively turn on BLUETOOTH signals.

The judgement unit is configured to obtain BLUETOOTH signal strengths corresponding to the other speaker devices collected by a current speaker device when a radio frequency signal strength of the current speaker device is less than a threshold. The judgement unit is further configured to communicate the current speaker device to a target speaker device having a maximum BLUETOOTH signal strength. The target speaker device is configured to forward audio data to the current speaker device.

The selection unit is configured to enable the control device to obtain channel information corresponding to the channels, and the selection unit is configured to select target channels respectively for the speaker devices according to the channel information. The sending unit is configured to enable the control device to send the audio data to the speaker devices based on the target channels.

The terminal device comprises but is not limited to the processor 30 and the memory 31. Those skilled in the art should note that FIG. 3 is merely an example of the terminal device 3 and does not constitute a limitation on the terminal device 3. The terminal device 3 may comprise more or fewer components than that shown in FIG. 3, a combination of certain components, or different components. For example, the terminal device may further comprise an input/output device, a network access device, a bus, etc.

The processor 30 may be a central processing unit (CPU), a general-purpose processors, a digital signal processors (DSP), an application-specific integrated circuit (ASIC), a field-programmable gate arrays (FPGA), other programmable logic devices, discrete gate or transistor logic devices, discrete hardware components, etc. The general-purpose processor may be a microprocessor or any conventional processor, etc.

The memory 31 may be an internal storage unit of the terminal device 3, such as a hard disk or the memory of the terminal device 3. The memory 31 may also be an external storage device of the terminal device 3, such as a plug-in hard disk, a smart media card (SMC), a secure digital (SD) card, a flash card, etc. equipped on the terminal device 3. Furthermore, the memory 31 may also comprise both the internal storage unit and the external storage device of the terminal device 3. The memory 31 is configured to store the computer program 32 and other programs and data required by the control device (e.g., a roaming control device). The memory 31 may also be configured to temporarily store data that has been output or is to be output.

It should be understood that the order of the steps in the above-mentioned embodiments is not necessarily the order of the execution order, and the execution order of the steps should be determined by function and inherent logic, which should not be regarded as limitations to the implementation processes of the embodiments of the present disclosure.

It should be noted that content such as information interaction and execution processes between the above-mentioned devices/units is based on the same concept as the embodiments of the method of the present disclosure, and for specific functions and technical effects, reference may be made to the embodiments of the method, and details are not described herein again.

It is clearly understood by those skilled in the art that, for the purpose of convenient and brief description, only the foregoing functional units and division of the modules are used for illustration. In practical applications, the foregoing functions may be allocated to different functional units/modules according to needs, so that the internal structure of the device is divided into different functional units or modules to complete all or some of the functions described above. Functional units and modules in the embodiments may be integrated into one processing unit, or each of the units may exist alone physically, or two or more units are integrated into one unit. The integrated unit may be implemented in a form of hardware, or may be implemented in a form of a software functional unit. In addition, specific names of the functional units and modules are merely for ease of distinguishing the functional units and modules from each other, and are not intended to limit the protection scope of the present disclosure. For a specific working process of the functional units and modules in the foregoing system, reference may be made to a corresponding process in the foregoing embodiments of the method, and details are not described herein again.

The present disclosure further provides the computer-readable storage medium. The computer-readable storage medium comprises a computer program stored therein. The computer program is executed by the processor to execute the steps of the embodiments mentioned above.

The present disclosure further provides a computer program product, and when the computer program product runs on a mobile terminal, the mobile terminal implements the steps in the above-mentioned embodiments.

If the integrated units are implemented in a form of a software functional unit and sold or used as an independent product, the integrated units may be stored in the computer-readable storage medium. Based on the understanding, all or part of the processes in the above-mentioned embodiments of the present disclosure are completed by instructing relevant hardware through the computer program. The computer program is stored in the computer-readable storage medium. When the computer program is executed by the processor, the steps in the above-mentioned embodiments are implemented. The computer program comprises computer program codes, and the computer program codes are in source code form, object code form, executable files or some intermediate form. The computer-readable storage medium may at least comprise any entity or device that is capable of carrying the computer program codes to a camera device/terminal device, a recording medium, a computer memory, a read-only memory (ROM), a random access memory (RAM), electric carrier signals, telecommunication signals, or software distribution medium (e.g., a USB flash drive, a mobile hard disk, a disk or an optical disk). In some jurisdictions, under legislation and patent practice, the computer-readable storage medium is unable to be the electrical carrier signals or the telecommunications signals.

In the foregoing embodiments, the description of each of the embodiments has its own emphasis, and some features that are not detailed or described in some of the embodiments may refer to related descriptions of other embodiments.

Those skilled in the art may be aware that, in combination with examples described in the embodiments disclosed in the specification, units and algorithm steps thereof may be implemented by electronic hardware or a combination of computer software and electronic hardware. Whether the functions are performed by the hardware or the software depends on particular applications and design constraint conditions of the technical solutions. Those skilled in the art may use different methods to implement the described functions for each particular application, which should not be considered as beyond the scope of the present disclosure.

In the embodiments provided in the present disclosure, it should be understood that the disclosed apparatus, network device and method may be implemented in other manners. For example, the apparatus/network device of the embodiments described above are merely illustrative, and the division of the modules or units is merely a kind of logical function division, and there may be other division manners in actual implementation. For instance, a plurality of units or components may be combined or may be integrated into another system, or some features may be ignored or not performed. In addition, the displayed or discussed mutual coupling, direct coupling, or communication connection may be indirect coupling or communication connection through some interfaces, devices or units, and may be realized in electrical, mechanical, or other forms.

The units described as separate parts may or may not be physically separate, and parts of the units may or may not be physical units. That is, the parts of the units may be located in one position, or may be distributed on a plurality of network units.

It should be understood that when used in the specification and the appended claims of the present invention, the term "include" indicates a presence of described features, integers, steps, operations, elements, and/or components, but does not preclude a presence or addition of one or more other features, integers, steps, operations, elements, components, and/or sets thereof.

It should also be understood that the term "and/or" used in the specification and the appended claims of the present disclosure refers to any combination of one or more of the associated listed items and all possible combinations.

As used in the specification of the present disclosure and the appended claims, the term "if" can be interpreted as "when . . . ", "once", "in response to determining . . . ", or "in response to monitoring" depending on the context. Similarly, the phrase "if it is determined| or "if [described condition or event] is monitored" can be interpreted as meaning "once it is determined", "in response to determination", "once [described condition or event] is monitored", or "in response to monitoring [described condition or event]" depending on the context thereof.

In addition, in the description of the specification and the appended claims of the present disclosure, terms such as "first", "second", and "third" are only used for the purpose of description, rather than being understood to indicate or imply relative importance.

Reference throughout this specification to "one embodiment" or "some embodiments" or the like means that a particular feature, structure, or characteristic described in connection with the embodiment is included in one or more embodiments of the present disclosure. Thus, appearances of phrases "in one embodiment", "in some embodiments", "in some other embodiments", "in other embodiments", and the like in various places throughout the specification are not necessarily all referring to the same embodiment, but mean "one or more but not all embodiments" unless otherwise specifically emphasized in other ways. Terms "comprise", "include" "have" and variations thereof mean "including, but not limited to", unless otherwise specifically emphasized.

The above-mentioned embodiments are only used to illustrate technical solutions of the present disclosure, but not to limit the present disclosure. Although the present disclosure has been described in detail with reference to the foregoing embodiments. It should be understood that those of ordinary skill in the art are still able to modify the technical solutions described in the foregoing embodiments, or equivalently replace some of the technical features in the foregoing embodiments; and these modifications or replacements do not make the essence of the corresponding technical solutions deviate from spirit and scope of the technical solutions of the embodiment of the present disclosure, which shall be included in the protection scope of the present disclosure.

What is claimed is:

1. A wireless communication method for speaker devices, applied to a sound system comprising a control device and speaker devices, comprising steps:

wirelessly communicating the speaker devices with the control device based on a 5.8 GHz frequency band;

obtaining, by the control device, sub-bands in the 5.8 GHz frequency band, and configuring the sub-bands as channels;

receiving, by the speaker devices, the explore frame, and extracting a target field in the explore frame by each of the speaker devices;

performing, by each of the speaker devices, an exclusive OR (XOR) operation on the target field and a pre-stored field thereof to obtain a calculation result, and sending the calculation result and a local message authentication code (MAC) address of each of the speaker devices to the control device;

sending, by the control device, explore data to the speaker devices by predetermined channels, and obtaining radio frequency signal strengths respectively corresponding to the speaker devices according to the explore data;

sending, by the control device, BLUETOOTH instructions to the speaker devices, and obtaining BLUETOOTH signal strengths corresponding to other speaker devices collected by each of the speaker devices, where the BLUETOOTH instructions are respectively configured to control the speaker devices to respectively turn on BLUETOOTH signals;

obtaining BLUETOOTH signal strengths corresponding to the other speaker devices collected by a current speaker device when a radio frequency signal strength of the current speaker device is less than a threshold, communicating the current speaker device with a target speaker device having a maximum BLUETOOTH signal strength, and forwarding audio data to the current speaker device by the target speaker device;

obtaining, by the control device, channel information corresponding to the channels, and selecting target channels respectively for the speaker devices according to the channel information; and sending, by the control device, the audio data to the speaker devices based on the target channels.

2. The wireless communication method for the speaker devices according to claim 1, wherein the step of wirelessly communicating the speaker devices with the control device based on the 5.8 GHz frequency band comprises steps:

broadcasting, by the control device, an explore frame based on the 5.8 GHz frequency band, and turning on a wireless network;

performing, by the control device, a correctness check on each calculation result;

when one calculation result is verified to be passed, sending a response frame to the local MAC address of a corresponding speaker device corresponding to the one calculation result, where the response frame comprises a service set identifier and a password; and communicating with the wireless network by the corresponding speaker device according to the service set identifier and the password.

3. The wireless communication method for the speaker devices according to claim 1, wherein the step of obtaining, by the control device, the channel information corresponding to the channels, and selecting the target channels respectively for the speaker devices according to the channel information comprises:

obtaining radio frequency signal strengths, signal-to-noise ratios, bit error rates, delays, capacities, and power consumption of the channels;

calculating first channel qualities respectively corresponding to the channels according to the radio frequency signal strengths, the signal-to-noise ratios, the bit error rates, the delays, the capacities, and the power consumption of the channels;

calculating second channel qualities respectively corresponding to the channels according to the radio frequency signal strengths, the signal-to-noise ratios, the bit error rates, the delays, the capacities, and the power consumption of the channels; and selecting a first target channel for the target speaker device according to the first channel qualities, and selecting a second target channel for non-target speaker devices according to the second channel qualities.

4. The wireless communication method for the speaker devices according to claim 3, wherein the step of calculating the first channel qualities respectively corresponding to the channels according to the radio frequency signal strengths, the signal-to-noise ratios, the bit error rates, the delays, the capacities, and the power consumption of the channels comprises:

substituting a radio frequency signal strength, a signal-to-noise ratio, bit error rates, delays, a capacity, and power consumption of each of the channel into a formula (1) to obtain each of the first channel qualities;

$$Q_1 = \sum_{i=1}^{n}\left[\frac{S * \log(SNR + I)}{\log(BER_I + I)} + + \prod_{j=1}^{m}\left(\frac{T_j + j}{C}\right) + \sqrt{p}\right]; \quad (1)$$

wherein $Q_1$ represents each of the first channel qualities, SNRrepresents the signal-to-noise ratio of each of the channels, $BER_i$ represents an $i^{th}$ bit error rate of each of the channels, C represents the capacity of each of the channels, $T_j$ represents a $j^{th}$ delay of each of the channels, m represents a quantity of a delay of each of the channels, S represents the radio frequency signal strength of each of the channels, n represents a quantity of the bit error rates of each of the channels, and P represents the power consumption of each of the channels.

5. The wireless communication method for the speaker devices according to claim 3, wherein the step of calculating the second channel qualities respectively corresponding to the channels according to the radio frequency signal strengths, the signal-to-noise ratios, the bit error rates, the delays, the capacities, and the power consumption of the channels comprises substituting a radio frequency signal strength, a signal-to-noise ratio, bit error rates, delays, a capacity, and power consumption of each of the channel into a formula (2) to obtain each of the second channel qualities;

$$Q_2 = \frac{S}{SNR} * \left(1 - \sum_{i=1}^{n} BER_i\right) * \left(1 - \sum_{j=1}^{m} T_j\right) * C * e^{-p} \quad (2)$$

wherein $Q_2$ represents each of the second channel qualities, SNRrepresents the signal-to-noise ratio of each of the channels, $BER_i$ represents an $i^{th}$ bit error rate of each of the channels, C represents the capacity of each of the channels, $T_j$ represents a $j^{th}$ delay of each of the channels, m represents a quantity of delays of each of the channels, S represents the radio frequency signal strength of each of the channels, n represents a quantity of the bit error rates of each of the channels, and P represents the power consumption of each of the channels.

6. The wireless communication method for the speaker devices according to claim 1, wherein the step of obtaining the BLUETOOTH signal strengths corresponding to the other speaker devices collected by the current speaker device when the radio frequency signal strength of the current speaker device is less than the threshold, communicating the current speaker device with the target speaker device having the maximum BLUETOOTH signal strength, and forwarding the audio data to the current speaker device by the target speaker device comprises steps:

obtaining the BLUETOOTH signal strengths corresponding to the other speaker devices collected by the current speaker device when the radio frequency signal strength of the current speaker device is less than the threshold;

determining the target speaker device having the maximum BLUETOOTH signal strength by the current speaker device, and sending device information of the target speaker device to the control device by the current speaker device;

obtaining, by the control device, a current radio frequency signal strength corresponding to the device information; and communicating the current speaker device with the target speaker device having the maximum BLUETOOTH signal strength by the control device when the current radio frequency signal strength is not less than the predetermined strength.

7. The wireless communication method for the speaker devices according to claim 3, wherein the step of selecting the first target channel for the target speaker device according to the first channel qualities; and selecting the second target channel respectively for the non-target speaker devices according to the second channel qualities comprises:

sorting the channels according to the first channel qualities, and taking a first sorted channel as the first target channel of the target speaker device; and sorting remaining channels according to the second channel qualities, and taking a first sorted remaining channel as the second target channel of the non-target speaker devices, where the remaining channels refer to channels other than the first target channel.

8. A wireless communication device for speaker devices, comprising:

a communication unit, an acquisition unit, an explore unit, a detection unit, a Judgment unit, a selection unit, and a sending unit;

wherein the communication unit is configured to wirelessly communicate the speaker devices to the control device based on a 5.8 GHz frequency band;

the acquisition unit is configured to enable the control device to obtain sub-bands in the 5.8 GHz frequency band, where the sub-bands are served as channels;

receiving, by the speaker devices, the explore frame, and extracting a target field in the explore frame by each of the speaker devices;

performing, by each of the speaker devices, an exclusive OR (XOR) operation on the target field and a pre-stored field thereof to obtain a calculation result, and sending the calculation result and a local message authentication code (MAC) address of each of the speaker devices to the control device;

the explore unit is configured to enable the control device to send explore data to the speaker devices through predetermined channels; the explore unit is configured to obtain radio frequency signal strengths respectively corresponding to the speaker devices according to the explore data;

wherein the detection unit is configured to enable the control device to send BLUETOOTH instructions to the speaker devices, and the detection unit is configured to obtain BLUETOOTH signal strengths corresponding to other speaker devices collected by each of the speaker devices; the BLUETOOTH instructions are respectively configured to control the speaker devices to respectively turn on BLUETOOTH signals;

wherein the judgement unit is configured to obtain BLUETOOTH signal strengths corresponding to the other speaker devices collected by a current speaker device when a radio frequency signal strength of the current speaker device is less than a threshold, the judgement unit is further configured to communicate the current speaker device to a target speaker device having a maximum BLUETOOTH signal strength; the target speaker device is configured to forward audio data to the current speaker device;

wherein the selection unit is configured to enable the control device to obtain channel information corresponding to the channels, and the selection unit is configured to select target channels respectively for the speaker devices according to the channel information; the sending unit is configured to enable the control device to send the audio data to the speaker devices based on the target channels.

9. A terminal device, comprising:

a memory, a processor, and a computer program;

wherein the computer program is stored in the memory and is executable on the processor, when the processor executes the computer program, the steps of the wireless communication method according to claim 1 are implemented.

10. A computer-readable storage medium, comprising:

a computer program stored therein;

wherein the computer program is executed by a processor, the steps of the wireless communication method according to claim 1 are implemented.

* * * * *